Jan. 20. 1925.
J. L. GRISWOLD
1,523,804
WEED BRUSH FOR CULTIVATORS
Filed Aug. 17, 1921
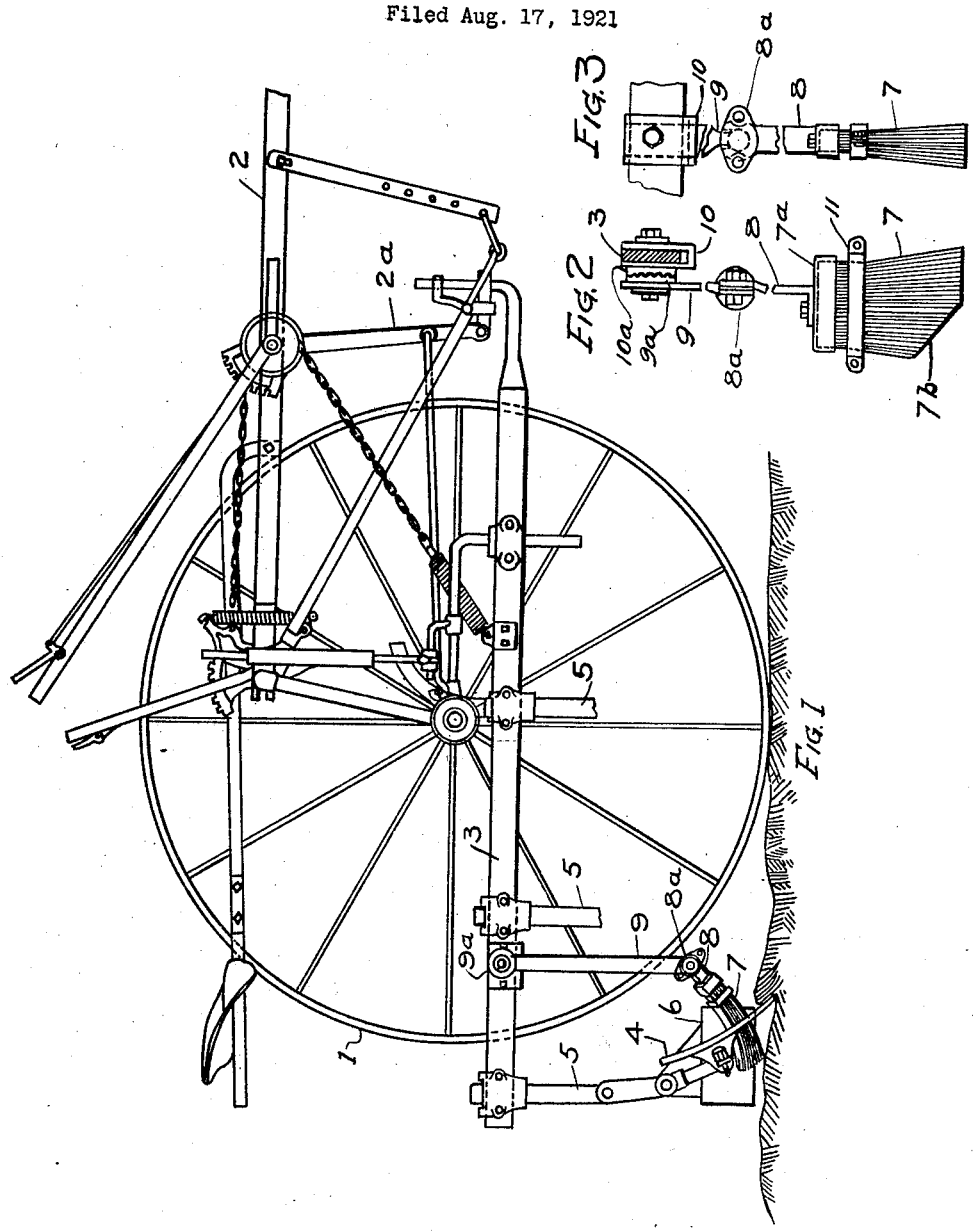
INVENTOR
JOHN L. GRISWOLD
BY HIS ATTORNEY
James F. Williamson Patented Jan. 20, 1925.

1,523,804

UNITED STATES PATENT OFFICE.

JOHN L. GRISWOLD, OF DODGE CENTER, MINNESOTA.

WEED BRUSH FOR CULTIVATORS.

Application filed August 17, 1921. Serial No. 492,888.

*To all whom it may concern:*

Be it known that I, JOHN L. GRISWOLD, a citizen of the United States, residing at Dodge Center, in the county of Dodge and State of Minnesota, have invented certain new and useful Improvements in Weed Brushes for Cultivators; and I do hereby declare the following to be a full, clear, and exact description of the invention, such as will enable others skilled in the art to which it appertains to make and use the same.

This invention relates to a plow or cultivator and particularly to a device adapted to be attached thereto for acting on the weeds or grass and to lay the same down close to the ground so that they will be covered by the soil which is turned up and distributed by the shovel or share. If the weeds or grass are merely bent over and partially covered by the soil they will continue to grow, but if they are entirely covered, they will usually be killed and destroyed.

It is an object of this invention, therefore, to provide a member adapted to be attached to the beam of the cultivator or plow and to move along adjacent the shovel or share so that the weeds will be pushed down at a point where they will be completely covered by the dirt.

It is a further object of the invention to provide such a device in the form of a brush and to so mount the same on the beam that it may be capable of universal variation or adjustment.

These and other objects of the invention will be apparent from the following description made in connection with the accompanying drawings in which like reference characters refer to the same parts throughout the different views, and in which—

Fig. 1 is a view in side elevation of a portion of a cultivator with the invention applied thereto;

Fig. 2 is a view partly in section showing the manner of attaching the brush to the plow beam; and Fig. 3 is a view in side elevation of the device shown in Fig. 2.

Referring to the drawings, a cultivator of standard type is illustrated comprising the wheels 1, frame members 2 and 2ª to which are connected the beams 3 which support the cultivator shovels. A seat and controlling lever are also illustrated but form no part of the present invention and need no further description. The shovels or shares 4 are rigidly secured to the bars 5 which are clamped by detachable clamps to the beams 3. Guard shields 6 shown as rectangular pieces of sheet metal are also carried on bars which depend from the beam 3 and are detachably clamped thereto, these guards serving to protect the plants and preventing the same from being covered by the earth distributed by the members 4.

In accordance with the present invention a brush 7 of relatively narrow thickness is mounted to travel just ahead of the member 4 and adjacent the same and the shield member 6. This brush 7 has an obliquely cut side edge to fit the guard 6 and a head portion 7ª connected in any suitable manner to a bar 8, which bar is, in turn, adjustably connected to a second bar 9 by a ball and socket joint formed by the ball 8ᵇ and its surrounding clamping member 8ª. This affords a universal joint, permitting variation and regulating adjustment of the brush in all directions. Such adjustment is obtained by loosening the member 8ª, moving the member 8 to the desired position and then tightening the member 8ª. The bar 9 is adjustably connected to the beam 3 in the following manner:—

A circular plate 9ª radially notched cooperates with a similarly notched plate 10ª forming part of a U-shaped clamp 10 which is adapted to fit over the beam 3 of the plow or cultivator. The member 10 is tightly clamped to the beam and to the bar 9 by a headed and nutted bolt passing therethrough and through a suitable aperture formed in the beam. While a particular type of clamp device for attaching the bar 9 to the beam has been described, it will be understood that any quickly detachable clamp will serve equally well. It will be noted that by means of the universal joint between the bars 8 and 9 and the connection between the bar 9 and member 10, that the brush can be quickly varied in all desired directions and thus moved into the most efficient position for acting on the weeds. In practice, the brush 7 may vary considerably in type, but is shown as comprising a head 7ª and a clamping band 11 secured thereon by suitable headed and nutted bolts which hold the bristles or wires firmly in position.

The operation of the device will be apparent from the above description and may be briefly summarized as follows.

The brushes 7 project rearwardly from the beam and are disposed slightly in front of the members 4 with their lower ends in close proximity to the surface of the ground. As the cultivator moves forward, the brushes will contact with any weeds which may be growing in the rows between the plants in close proximity thereto, and such weeds will be brushed down and laid approximately flat along the ground. While being held in this position, the weeds will be covered by the dirt thrown over by the shovels of shares 4 and will thus be effectively covered up and killed. In practice, it has been found that a brush from four to six inches wide and six to ten inches long forms a very efficient size for the purpose intended, although the invention is not limited to any size of brush and the brush may be varied in size and type as desired.

It will, of course, be understood that various changes may be made in the form, details and arrangement of the device without departing from the scope of applicant's invention, which generally stated, consists in the matter shown and described and set forth in the appended claim.

What is claimed is:

The combination with the shovel and guard shield of a cultivator, of a brush mounted at an angle to the said shovel and shield and between the same and to move in close proximity to the ground whereby it will sweep down weeds so that the same will be covered by the earth distributed by the shovel.

In testimony whereof I affix my signature.

JOHN L. GRISWOLD.